US005638943A

United States Patent [19]
Foster

[11] Patent Number: 5,638,943
[45] Date of Patent: Jun. 17, 1997

[54] DRIVE ASSEMBLY FOR RECIPROCATING SLAT CONVEYOR

[76] Inventor: Raymond Keith Foster, P.O. Box 1, Madras, Oreg. 97741

[21] Appl. No.: 563,985

[22] Filed: Nov. 29, 1995

[51] Int. Cl.⁶ .................................................. B65G 25/00
[52] U.S. Cl. ...................................... 198/750.5; 198/750.2
[58] Field of Search ........................... 198/750.1, 750.2, 198/750.5, 750.6, 750.7

[56] References Cited

U.S. PATENT DOCUMENTS

| | | | |
|---|---|---|---|
| 4,748,893 | 6/1988 | Foster | 91/176 |
| 4,793,469 | 12/1988 | Foster | 198/750 |
| 5,165,524 | 11/1992 | Foster | 198/750 |
| 5,263,573 | 11/1993 | Hallstrom, Jr. | 198/750 |
| 5,390,781 | 2/1995 | Foster | 198/750 |
| 5,489,018 | 2/1996 | Foster | 198/750.5 |

*Primary Examiner*—James R. Bidwell
*Attorney, Agent, or Firm*—Joan H. Pauly; Delbert J. Barnard

[57] ABSTRACT

Each of a plurality of side-by-side drive units (90, 92, 94) has a cylinder barrel component (98, 100, 102, 104, 106, 108) at each end and a centrally positioned piston component (110, 112, 114). The drive assembly also includes a pair of longitudinally spaced apart transverse mounting frame members (116, 118), each of which has an elongated body (124) with a corrugated center section (132). The center section (132) has a plurality of alternating ridges (134) and valleys (136) extending transversely of the body (124). Each valley (136) is sized to receive a cylinder barrel component. The cylinder barrel components are secured by clamps (142). At least one strengthening rib (126, 128, 130) is secured to the body (124) and extends crosswise of the ridges (134) and valleys (136) to strengthen the corrugated center section (132). The cylinder barrel components have opposite end flanges (144, 146) that abut the mounting frame members (116, 118) to restrain longitudinal movement of the components. In alternative embodiments, only one end of each drive unit has a cylinder barrel component mounted in a valley of a corrugated frame member. At the opposite end, a piston rod is slidably connected to another frame member.

49 Claims, 9 Drawing Sheets

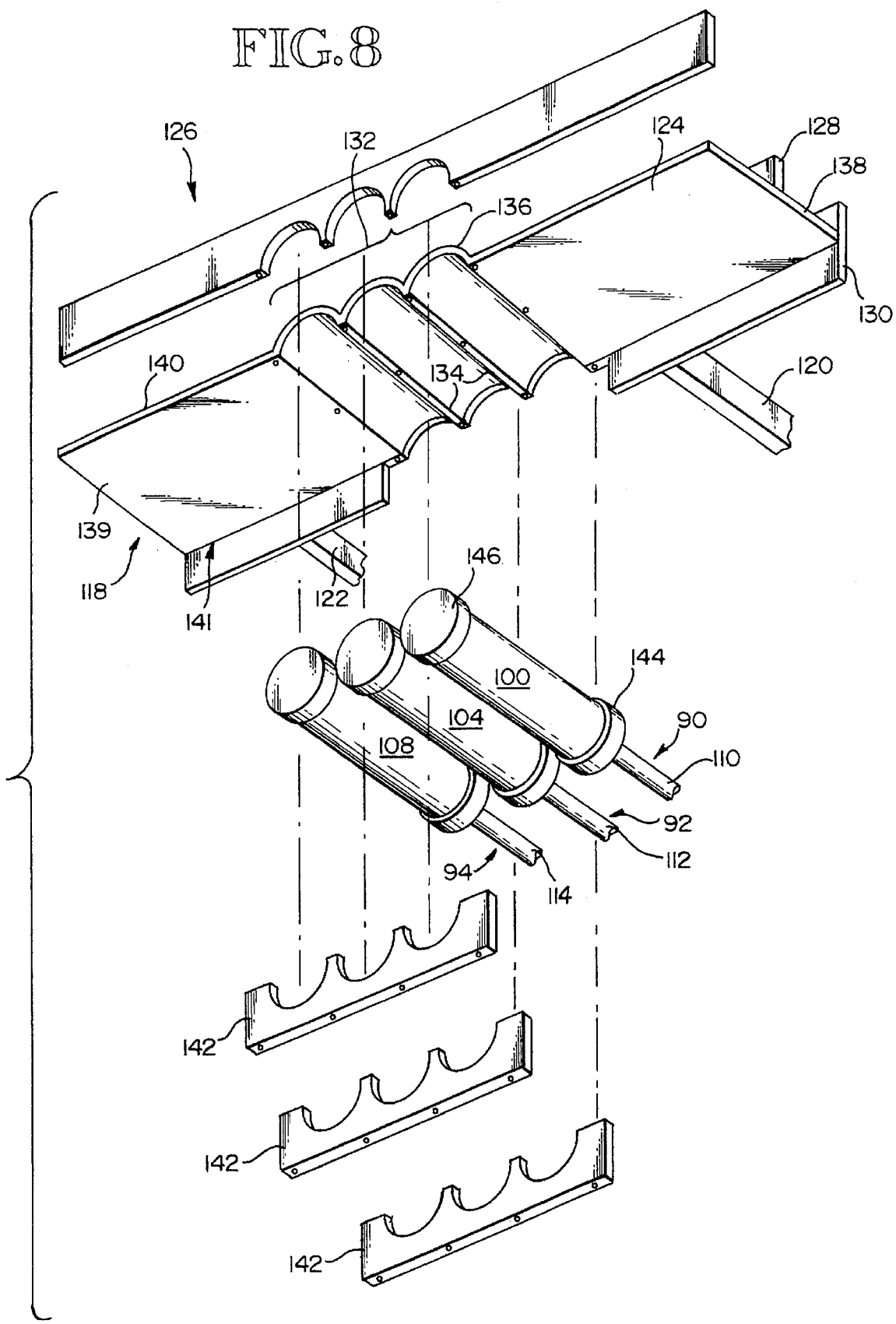

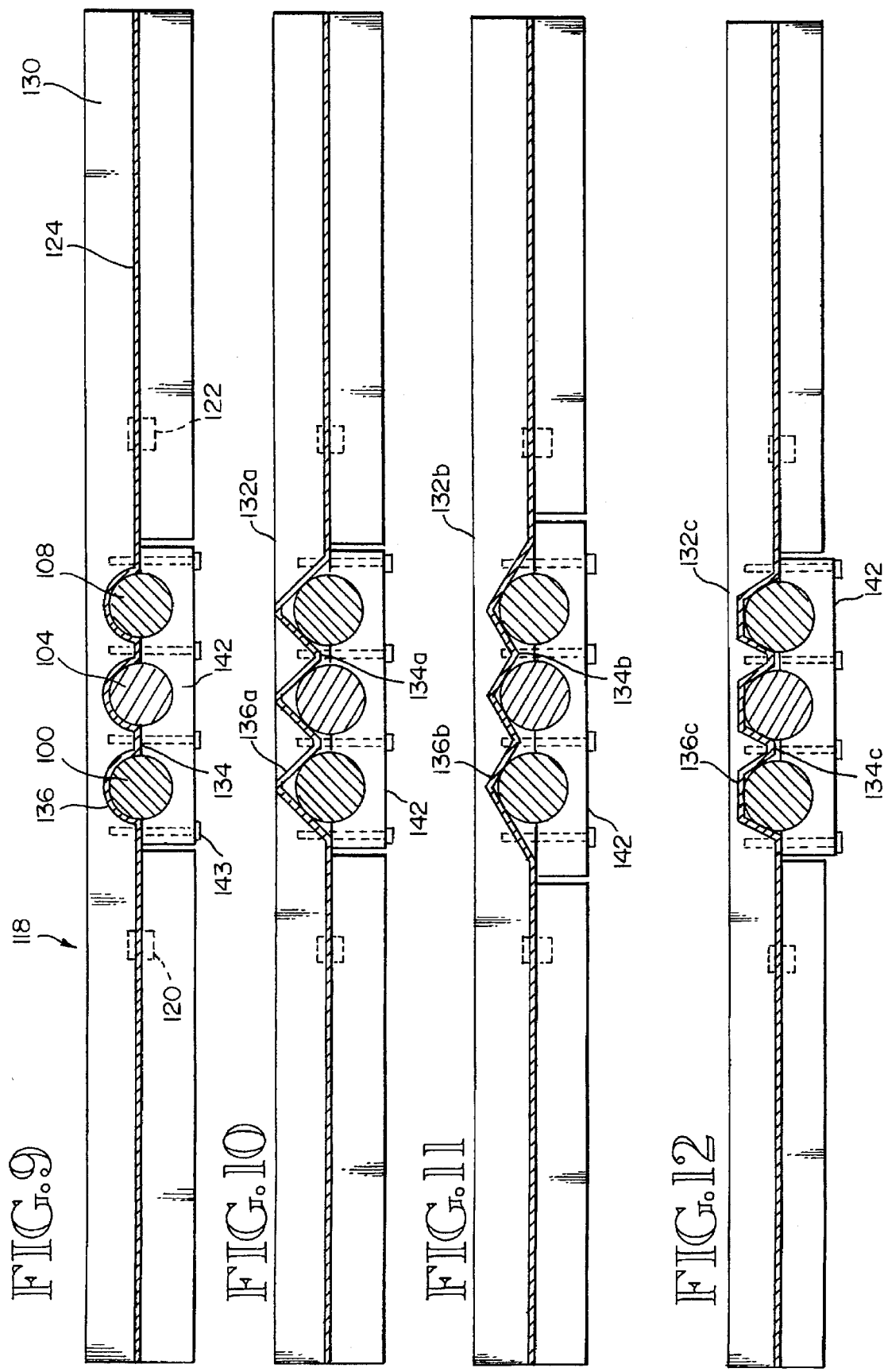

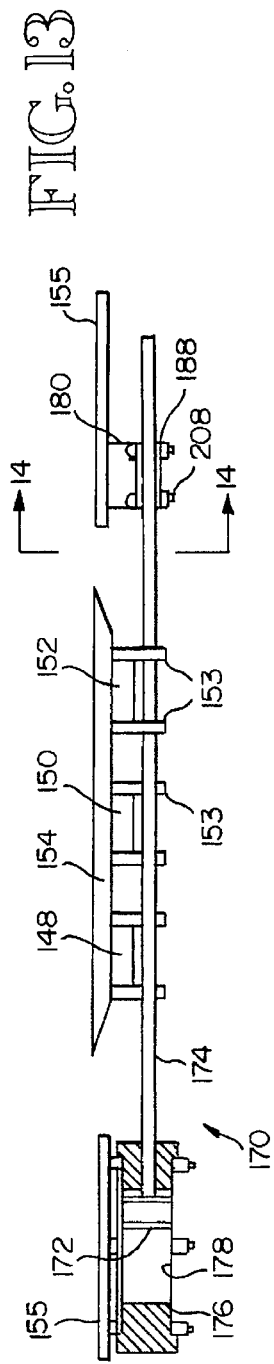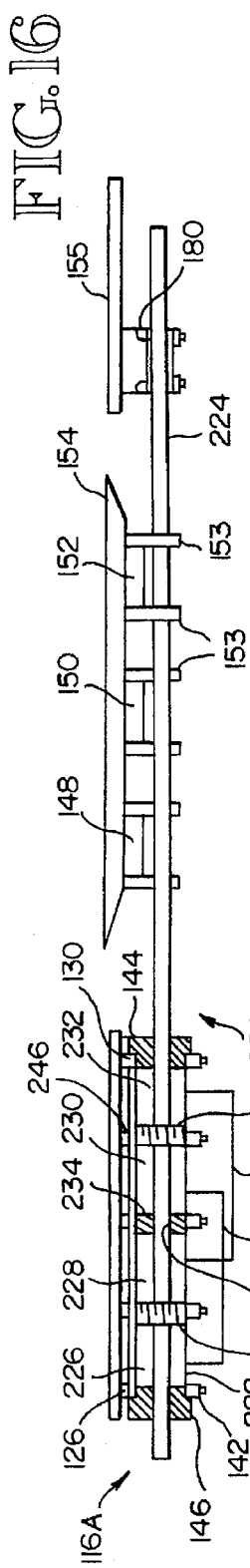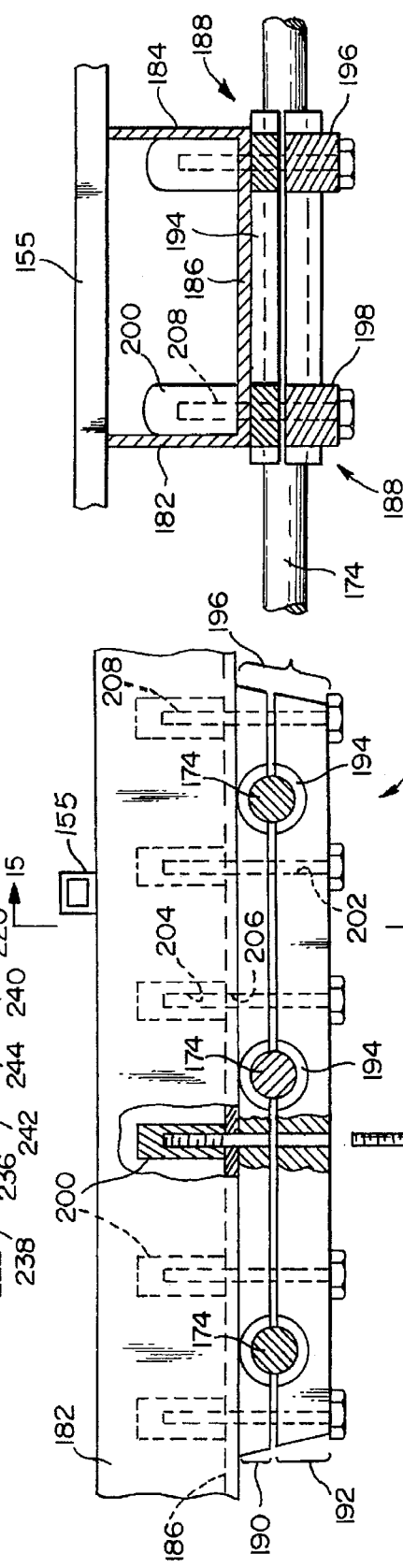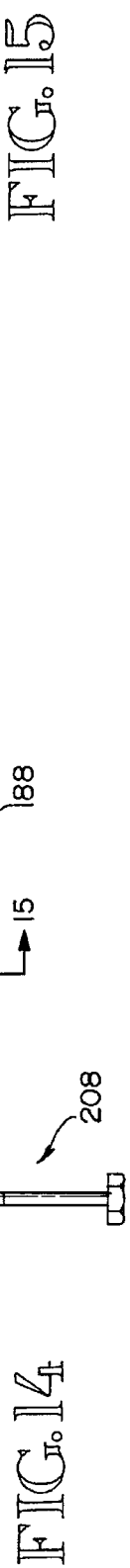

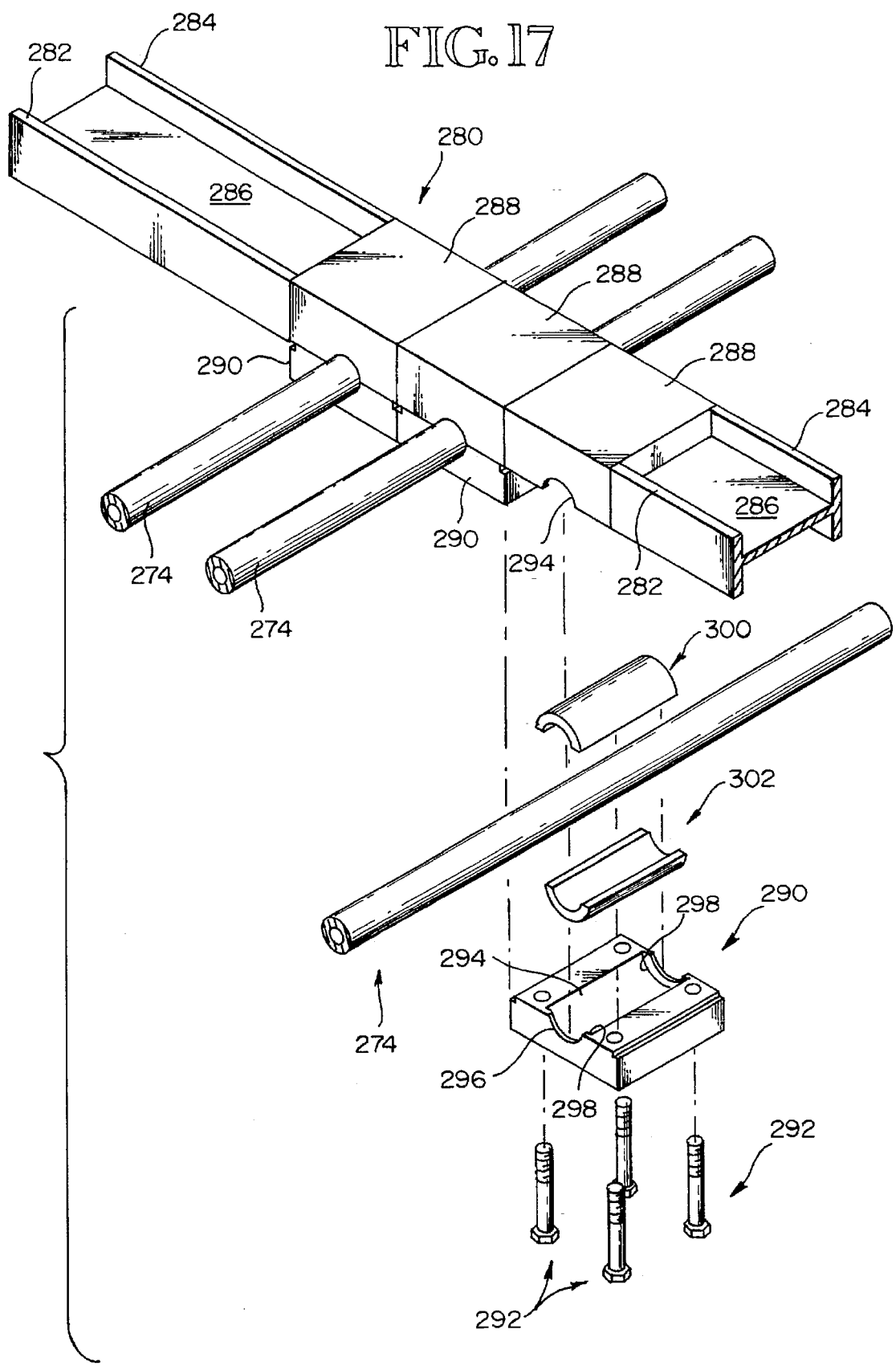

DRIVE ASSEMBLY FOR RECIPROCATING SLAT CONVEYOR

TECHNICAL FIELD

This invention relates to a drive assembly for a reciprocating slat conveyor and, more particularly, to the provision of a mounting frame assembly that is adapted to position the thrust lines of the drive units vertically close to the longitudinal centers of the conveyor floor slat members.

BACKGROUND OF THE INVENTION

Reciprocating slat conveyors are used in various types of installations and may be mounted on different kinds of structures. One example of a structure into which a reciprocating slat conveyor may be incorporated is a trailer. Reciprocating slat conveyors are typically mounted on an existing trailer or other structure, rather than being manufactured together with the structure itself as an original part of the structure. Therefore, it is desirable for a conveyor to be relatively easy to mount onto a structure. Ease in mounting is preferably accomplished while also achieving and/or maintaining compactness and strength in the drive assembly of the conveyor.

Compact drive assemblies for reciprocating slat conveyors are disclosed in my U.S. Pat. No. 4,748,893, granted Jun. 7, 1988, and entitled "Drive/Frame Assembly For A Reciprocating Floor"; U.S. Pat. No. 4,793,469, granted Dec. 27, 1988, and entitled "Reduced Size Drive/Frame Assembly For A Reciprocating Floor Conveyor"; and U.S. Pat. No. 5,165,524, granted Nov. 24, 1992, and entitled "Reciprocating Floor Conveyor". A prior art drive assembly of some interest is disclosed in U.S. Pat. No. 5,263,573, granted Nov. 23, 1993, to Olof A. Hallstrom, Jr., and entitled "Drive Connector For Reciprocating Conveyor". A further prior art drive assembly is shown by FIGS. 1–4 of the drawing of the present application. FIGS. 1–4 illustrate the supporting structural framework for the drive units that provide the thrust force and the connection of the drive units to the floor slat members.

Optimally, the longitudinal center of a floor slat member of a reciprocating floor conveyor and its corresponding drive unit would be on the same center line. The thrust line of the drive unit would be in full alignment with the floor slat member. This optimal condition is not possible. However, it is a realistic and desirable goal to have the thrust lines of the drive units positioned as vertically close to the longitudinal centers of the respective floor slats as possible to maintain proper alignment of the thrust lines and strength of the structural frame. The longer the distance between an individual thrust line and its corresponding floor slat member, the longer the bending moment. The longer the bending moment, the greater the potential for misalignment of the thrust line and transfer of thrust force to potentially weaker structural members of the frame.

An object of this invention is to provide an improved drive assembly in which the thrust lines of the drive units are vertically closer to the longitudinal centers of the conveyor slats than in the prior art assemblies. Another object of this invention is to transfer thrust force to the strongest of the structural members of the frame.

SUMMARY OF THE INVENTION

According to an aspect of the invention, an elongated mounting frame member is provided for use in mounting two or more piston-cylinder drive units in a side-by-side relationship. Each drive unit has a piston component and a cylinder barrel component. The mounting member is basically characterized by an elongated body having a corrugated center section comprising alternating ridges and valleys, extending transversely of the body, and opposite end sections extending endwise outwardly from the center section. Each valley of the center section is sized to receive nested therein one of the cylinder barrel components of the drive units. Connector means is provided for connecting the cylinder barrel components of the drive units to the mounting frame member, with the cylinder barrel components of the drive units nested within the valleys of the center section. In use, the opposite end sections of the body of the mounting frame member serve to mount the mounting frame member and the drive units to a frame, with the piston components of the drive units extending endwise outwardly from the cylinder barrel components, perpendicular to the mounting frame member.

Another aspect of the invention involves the provision of a drive assembly for a reciprocating slat conveyor which includes at least two piston-cylinder drive units in a side-by-side relationship, mounting frame members, and drive beams. Each drive unit has a cylinder barrel component at each of its ends and a centrally positioned piston component. The piston component has a piston head at each of its ends. The piston heads are received within the cylinder barrel components. The drive assembly has a pair of longitudinally spaced apart transverse mounting frame members of the character described. That is, each mounting member has an elongated body with a corrugated center section comprising alternating ridges and valleys extending transversely of the body, and opposite end sections extending endwise outwardly from the corrugated center section. The valleys of each corrugated center section receive nested therein the cylinder barrel components at one end of the drive units, and the cylinder barrel components are connected to the mounting frame member. A transverse drive beam is provided for each drive unit. Each drive beam extends across and is connected to the piston component of its drive unit. Each drive beam includes connectors configured to connect the drive beam to a set of conveyor slats. In use, the opposite end sections of the mounting frame members serve to mount the mounting frame members and the drive units to a frame.

In preferred form, each mounting frame member includes at least one stiffening rib that is secured to the elongated body of the mounting frame member. The rib extends lengthwise of the mounting frame member and crosswise of the ridges and valleys of the corrugated center section. Preferably, the rib extends along a longitudinal edge of the elongated body adjacent where the piston components project outwardly from the cylinder barrel components.

The manner in which the cylinder barrel components are connected to the mounting frame members may be varied. Preferably, there is at least one clamp member for each cylinder barrel component. The clamp member is detachably connectable to the respective mounting frame member, and, when so connected, serves together with a valley of the mounting frame member to clamp the cylinder barrel component to the mounting frame member.

Another preferred feature is the inclusion in each cylinder barrel component of two opposite end flanges, each of which has a radial shoulder. The valleys in the center sections of the mounting frame bodies are dimensioned so that the radial shoulders substantially abut the respective mounting frame member when the cylinder barrel components are nested within the valleys. This preferred feature may be provided in combination with the clamp members, preferably in combination with at least two clamp members for each cylinder barrel component. The valleys are dimensioned, and the clamp members are positioned and dimensioned, so that the radial shoulders substantially abut the clamp members and the respective mounting frame member adjacent the valleys when the cylinder barrel components are nested within the valleys and clamped to the mounting frame members by the clamp members. The combination of preferred features may further include a stiffening rib secured to the elongated body of each mounting frame member and extending along a longitudinal edge of the body, crosswise of the ridges and valleys, adjacent where the piston components extend endwise outwardly from the cylinder barrel components. The radial shoulder of one of the end flanges of each cylinder barrel component substantially abuts the rib of the respective mounting frame member when the cylinder barrel components are nested within the valleys.

According to another aspect of the invention, a drive assembly includes at least two side-by-side piston-cylinder drive units, each drive unit having a cylinder barrel component positioned at one end of the drive unit and a piston component with a piston head and a piston rod. The piston head is received in the cylinder barrel component. The drive assembly also includes a pair of longitudinally spaced apart transverse mounting frame members. The first mounting frame member comprises an elongated body having a corrugated center section with at least two alternating ridges and valleys extending transversely of the body, and opposite end sections that extend endwise outwardly from the corrugated center section. The valleys of the corrugated center section receive nested therein the cylinder barrel components. The second mounting frame member comprises an elongated member. A first connector means connects the cylinder barrel components to the first mounting frame member, with the cylinder barrel components nested within the valleys of the corrugated center section. A second connector means connects the piston rods at an end opposite the piston heads to the second mounting frame member. A transverse drive beam for each drive unit extends across and connects to the piston rod. Each drive beam includes connectors configured to connect the drive beam to a set of conveyor floor slat members. In use, the first and second mounting frame members serve to mount both of the mounting frame members and the drive units to a frame, with the piston rods of the drive units extending perpendicular to the mounting frame members and the drive beams extending perpendicular to the drive units.

According to still another aspect of the invention, each drive unit in a drive assembly has a cylinder barrel component at one end of the unit, and a piston component with a piston rod and two piston heads. Each piston head is received in a separate chamber within the cylinder barrel component. The drive assembly also includes a pair of longitudinally spaced apart transverse mounting frame members. The first mounting frame member comprises an elongated body having a corrugated center section with at least two alternating ridges and valleys that extend transversely of the body, and opposite end Sections extending endwise outwardly from the corrugated center section. The valleys receive nested therein the cylinder barrel components, which are connected to the first mounting frame member. End portions of the piston rods opposite the piston heads are connected to the second mounting frame member. A transverse drive beam for each drive unit extends across and connects to the piston rod. Each drive beam includes connectors configured to connect the drive beam to a set of conveyor floor slat members.

A major advantage of the invention is that it both allows the drive units of a drive assembly to be positioned vertically closer to the corresponding floor slat members than in the prior art, and provides compactness and structural strength in the drive assembly.

These and other advantages and features will become apparent from the detailed description of the best modes for carrying out the invention that is set forth below.

BRIEF DESCRIPTION OF THE DRAWINGS

Like element designations refer to like parts throughout, and:

FIG. 8 is an exploded pictorial view of one end of the drive assembly shown in FIGS. 5–7, with the bolts that secure the clamps omitted;

FIG. 9 is a sectional view taken along the line 9—9 in FIG. 5;

FIG. 10 is a view like FIG. 9, but showing a modified construction of the corrugated section of the mounting frame member;

FIG. 11 is a view like FIGS. 9 and 10 but showing a third construction of the corrugated section of the mounting frame member;

FIG. 12 is a view like FIGS. 9–11 but showing a fourth construction of the corrugated section of the mounting frame member;

FIG. 13 is a side elevational view like FIG. 6 but showing a modified construction of the drive assembly;

FIG. 14 is an enlarged sectional view taken substantially along 14—14 of FIG. 13, and showing a bolt in exploded cutaway;

FIG. 15 is a transverse sectional view taken substantially along line 15—15 of FIG. 14; and FIG. 16 is a view like FIG. 13, but depicting an alternate drive assembly having balanced tandem drive units.

FIG. 17 is an exploded pictorial view of an alternative transverse mounting frame member and a corresponding mounting arrangement for the piston rods of drive units.

DESCRIPTION OF THE ILLUSTRATED PRIOR ART

Figure 2:
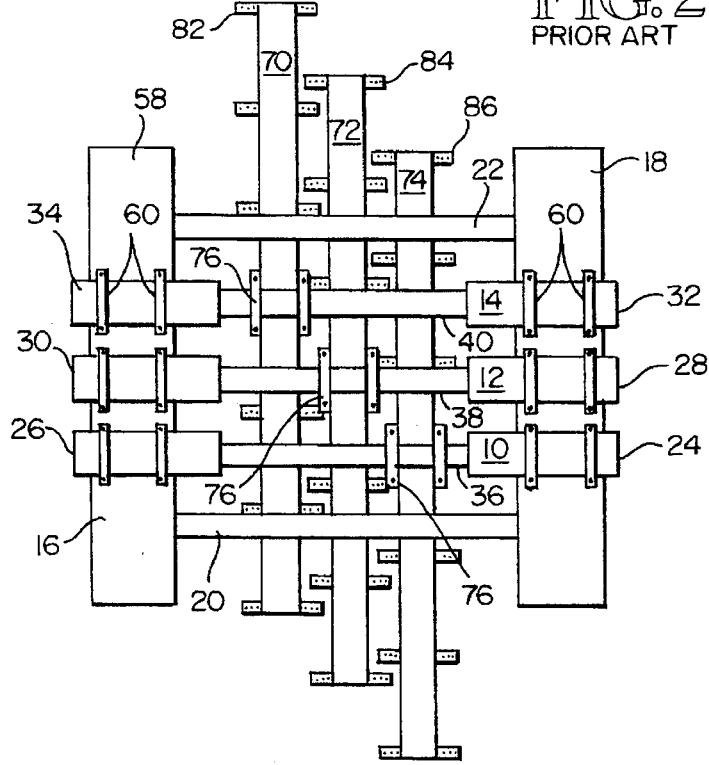
FIG. 2 is a bottom plan view of the prior art drive assembly shown in FIG. 1.
Figure 3:
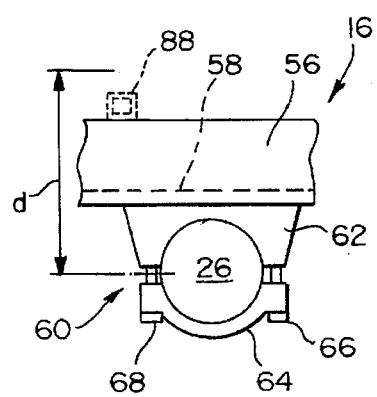
FIG. 3 is a fragmentary elevational view taken from the aspect of line 3—3 in FIG. 1, such view showing, in phantom lines, a single conveyor slat mounting and guiding member.
Figure 4:
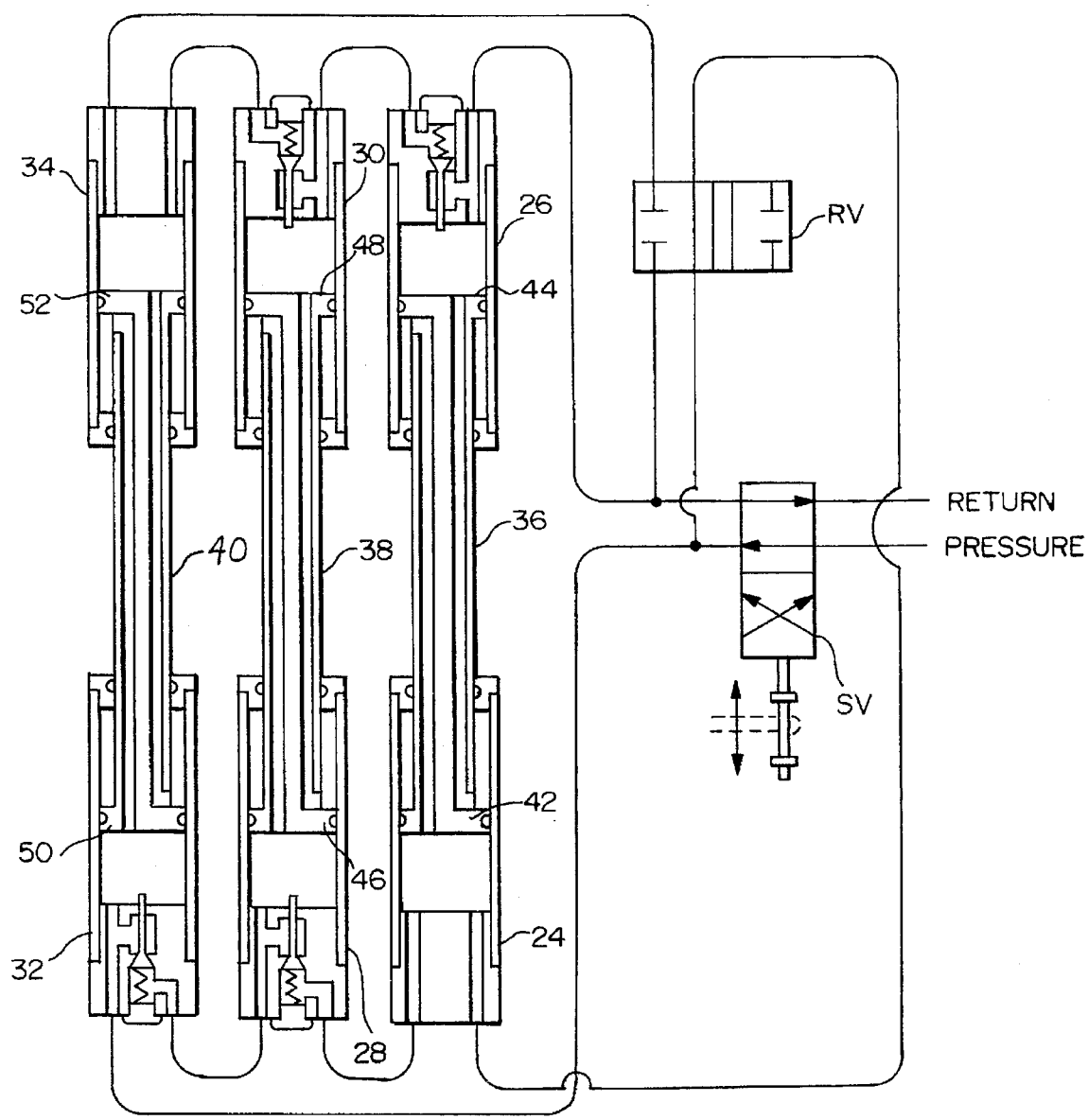
FIG. 4 is a schematic diagram of a power/control circuit for the drive assembly shown in FIGS. 1–3.

Referring to FIGS. 1–4, the prior art device shown in these figures comprises three piston-cylinder drive units 10, 12, 14 and a mounting frame composed essentially of a longitudinally spaced apart pair of transverse mounting frame members 16, 18 interconnected by a pair of laterally spaced apart longitudinal frame members 20, 22. The drive units 10, 12, 14 each have a cylinder barrel component 24, 26, 28, 30, 32, 34 at each end and a piston component 36, 38, 40 centrally positioned between the two cylinder barrel components 24, 26; 28, 30; and 32, 34, respectively. As best shown by FIG. 4, each piston component 36, 38, 40 has a piston head 42, 44, 46, 48, 50, 52 at each end. As illustrated, piston heads 42, 44 are positioned within cylinder barrel components 24, 26, respectively. Piston heads 46, 48 are positioned within cylinder barrel components 28, 30, respectively. Piston heads 50, 52 are positioned within cylinder barrel components 32, 34, respectively.

Figure 1:
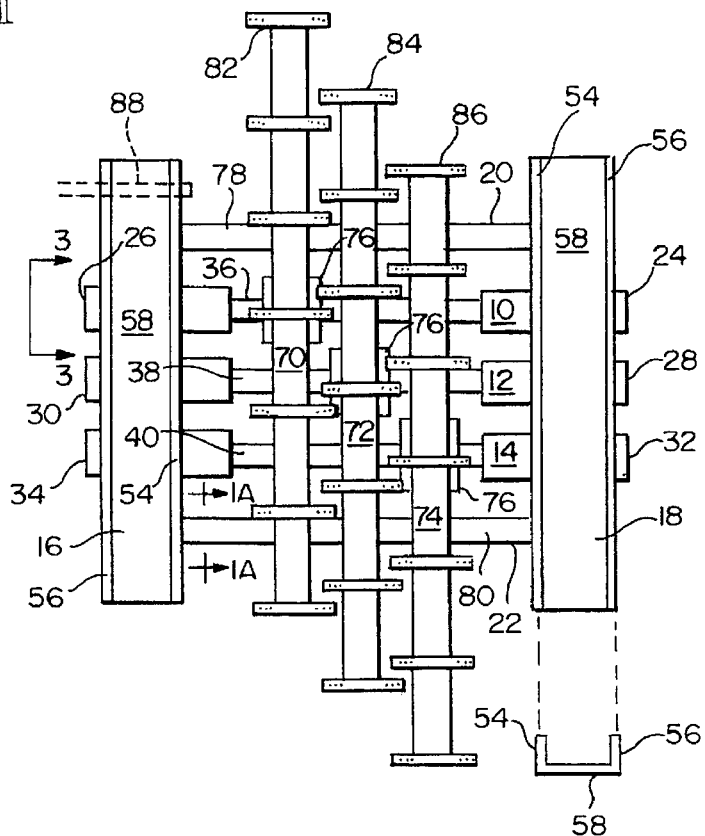
FIG. 1 is a top plan view of a prior art drive assembly for a reciprocating slat conveyor, and also shows an end view of a transverse frame member of the assembly.

As shown in FIG. 1, the transverse frame members 16, 18 are channel members and are oriented so that the flanges 54, 56 of the channels project upwardly. As best shown by FIGS. 2 and 3, each cylinder barrel portion 24, 26, 28, 30, 32, 34 of the drive units 10, 12, 14 is clamped to the base 58 (or web) of its respective channel 16, 18 by a plurality of clamps 60. Referring to FIG. 3, each clamp 60 comprises an upper part 62 that is welded or otherwise firmly secured to the web 58, and a removable lower clamp part 64. The upper and lower clamp parts 62, 64 are secured together and in a clamping relationship with the cylinder barrel portions by a pair of clamp bolts 66, 68. This type of clamp structure is well-known and is described in some detail in my aforementioned U.S. Pat. No. 4,793,469, and particularly in FIG. 17 of that patent and the description relating to such figure.

The prior art drive assembly shown by FIGS. 1 and 2 of the application drawing further includes three transverse drive beams 70, 72, 74, one for each drive unit 10, 12. Transverse drive beam 70 is detachably connected to piston component 36. Drive beam 72 is detachably connected to piston component 38. Drive beam 74 is detachably connected to piston component 40. As illustrated, the detachable connections are in the form of detachable clamp structures 76, which are also of the type disclosed in my aforementioned U.S. Pat. No. 4,793,469.

Figure 1A:
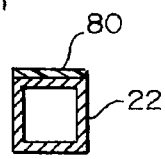
FIG. 1A is a sectional view taken along line 1A—1A in FIG. 1.

Opposite side portions of drive beams 70, 72, 74 ride on bearing strips 78, 80, which are secured to the tops of the longitudinal frame members 20, 22, as shown in FIG. 1A. The drive beams 70, 72, 74 each include connector members 82, 86 that extend into the conveyor floor slat members (not shown) and onto which the floor slat members are connected. As shown by FIG. 15 of my aforementioned U.S. Pat. No. 4,793,469, drive beams 70, 72, 74 fit into a window in a conveyor main frame that is bounded by end portions of longitudinal guide beams, which support and guide the floor slat members. One such longitudinal guide beam 88 is shown in phantom in FIGS. 1 and 3. One reason for the mounting member 16, 18 having a channel shape with upwardly directed flanges 54, 56, is so that longitudinal guide beams 88 can rest on and be secured to the flanges 54, 56.

A good example of a conveyor main frame is set forth in my aforementioned U.S. Pat. No. 5,165,524, which is incorporated herein by reference. Also incorporated herein by reference is my U.S. Pat. No. 4,785,929, granted Nov. 12, 1988 and entitled "Bearing System For Reciprocating Floor Conveyor", which shows in some detail the bearings that are attached to the longitudinal guide beams 88 and the manner in which the floor slat members engage the bearings.

The floor slat members reciprocate from the thrust movement of drive units 10, 12, 14. The floor slat members rest on top of the bearings disclosed in my aforementioned U.S. Pat. No. 4,785,929, which in turn are guided by the longitudinal guide beams. Optimally, distance d (shown in FIG. 3), which is the vertical distance between the longitudinal center of a floor slat member and the longitudinal center of the drive unit, should be as small as possible. The greater the distance d, the greater a bending moment during piston movement, and the greater the opportunity for thrust misalignment of the drive units and transferring thrust force to structurally weaker frame members.

The prior art control circuit shown by FIG. 4 is basically like the system shown in my U.S. Pat. No. 5,096,356, granted Mar. 17, 1992, and entitled "Reciprocating Floor Conveyor in a Receptacle For A Liquid Laden Material". It includes a switching valve SV that is controlled by contact with one or more of the drive beams 70, 72, 74. The switching valve SV is disclosed in detail in the aforementioned U.S. Pat. No. 5,096,356. The control circuit shown by FIG. 4 is constructed to provide two-way conveyance. It includes a reversing valve RV. When valve RV is in a first position, the conveyor moves material in a first direction. When the valve RV is in a second position, the conveyor moves the material in the opposite direction. This is a prior art system and is not a part of the present invention. Therefore, it will not be described in any greater detail herein.

BEST MODES FOR CARRYING OUT THE INVENTION

A first preferred embodiment of the invention is shown by FIGS. 5–9. Referring to these figures, the drive assembly of the invention comprises three piston-cylinder drive units 90, 92, 94, which are mounted in a side-by-side relationship in a frame 96. The drive units 90, 92, 94 each have a cylinder barrel component 98, 100, 102, 104, 106, 108 at each end and a centrally positioned piston component 110, 112, 114. The drive units shown in FIGS. 5–7 may in essential construction be like the prior art drive units shown in FIGS. 1–4, except that each cylinder barrel component has a flanged end.

Figure 5:
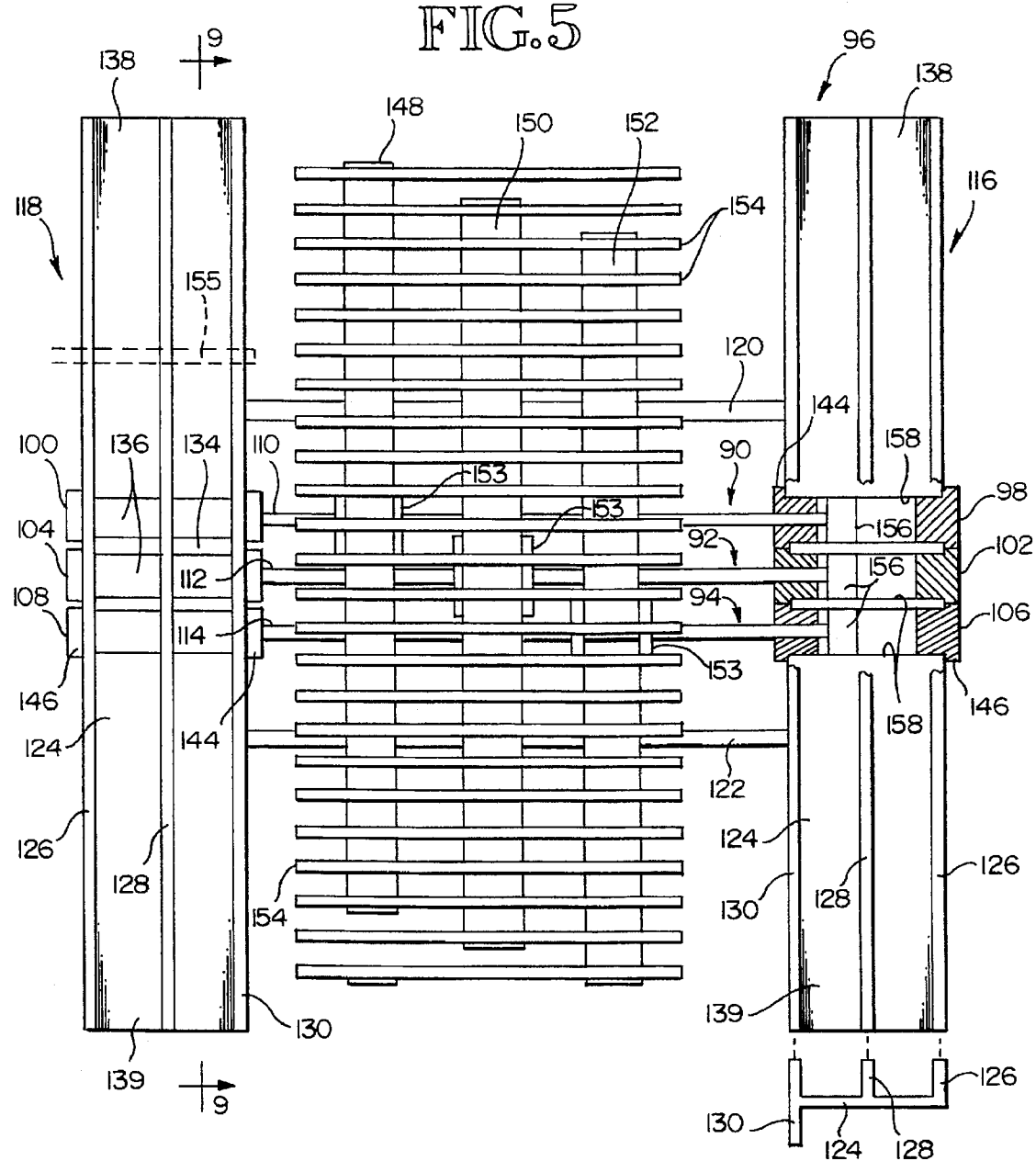
FIG. 5 is a top plan view of an embodiment of the invention, with end portions of the drive units shown schematically in longitudinal section at one end of the assembly and with an end view of a transverse mounting frame member also shown.

The frame 96 is basically characterized by a pair of elongated longitudinally spaced apart transverse mounting frame members 116, 118 and a pair of interconnecting longitudinal frame members 120, 122. Each transverse mounting frame member 116, 118 has an elongated plate body 124 reinforced by longitudinal ribs 126, 128, 130. As best shown by FIGS. 5 and 8, ribs 126, 128 are wholly situated above the body 124. Rib 130 has both an upwardly-extending portion and a downwardly-extending portion. Rib 130 may be made from a single member welded to the inboard edge of body 124, as illustrated. Or, it may be made from a pair of members, each like members 126, 128, one above and one below the plate body 124.

Figure 6:
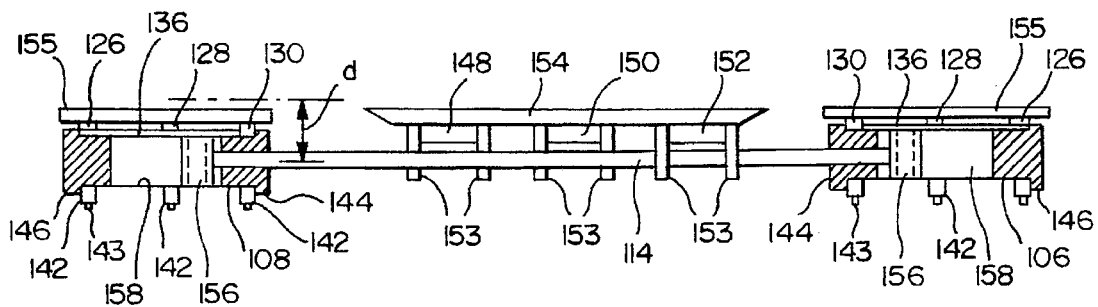
FIG. 6 is a side elevational view of the drive assembly shown in FIG. 5, but with both end portions of the drive units shown in schematic longitudinal section and the longitudinal frame members omitted.

Referring to FIGS. 8 and 9, each body 124 has a corrugated center section 132 comprising alternating ridges and valleys 134, 136 that extend transversely of the body 124. As will hereinafter be described in some detail, the valleys 136 are of a size and shape to receive nested therein the cylinder barrel components of the drive units. A pair of opposite end sections 138,139 extend endwise outwardly from the corrugated center section 132. The end sections 138, 139 serve to mount the mounting frame members 116, 118 and the drive units 90, 92, 94 to a frame, such as the main frame of a trailer. When mounted, the piston components 110, 112, 114 of the drive units 90, 92, 94 extend endwise outwardly from the cylinder barrel components, perpendicular to the mounting frame members 116, 118, as shown in FIGS. 5–7.

Ribs 126, 128, 130 have cutout central portions which correspond in shape to the corrugated center sections 132 of the bodies 124. The ribs 126, 128, 130 are welded or otherwise secured to the plate bodies 124 throughout their full lengths, including along the portions where the cutout regions of the ribs 126, 128, 130 meet the ridges 134 and valleys 136 of the corrugations. As illustrated, the ribs 126, 128, 130 extend lengthwise of the frame members 116, 118 and their plate bodies 124 and crosswise of the ridges 134 and valleys 136 and, thus, strengthen and stiffen the corrugated sections 132 of the frame members 116, 118. Referring to FIGS. 5, 7, and 8, on each frame member 116, 118, strengthening ribs 126, 130 extend along opposite longitudinal edges 140, 141 of body 124. Rib 128 is spaced midway between ribs 126, 130.

Figure 7:
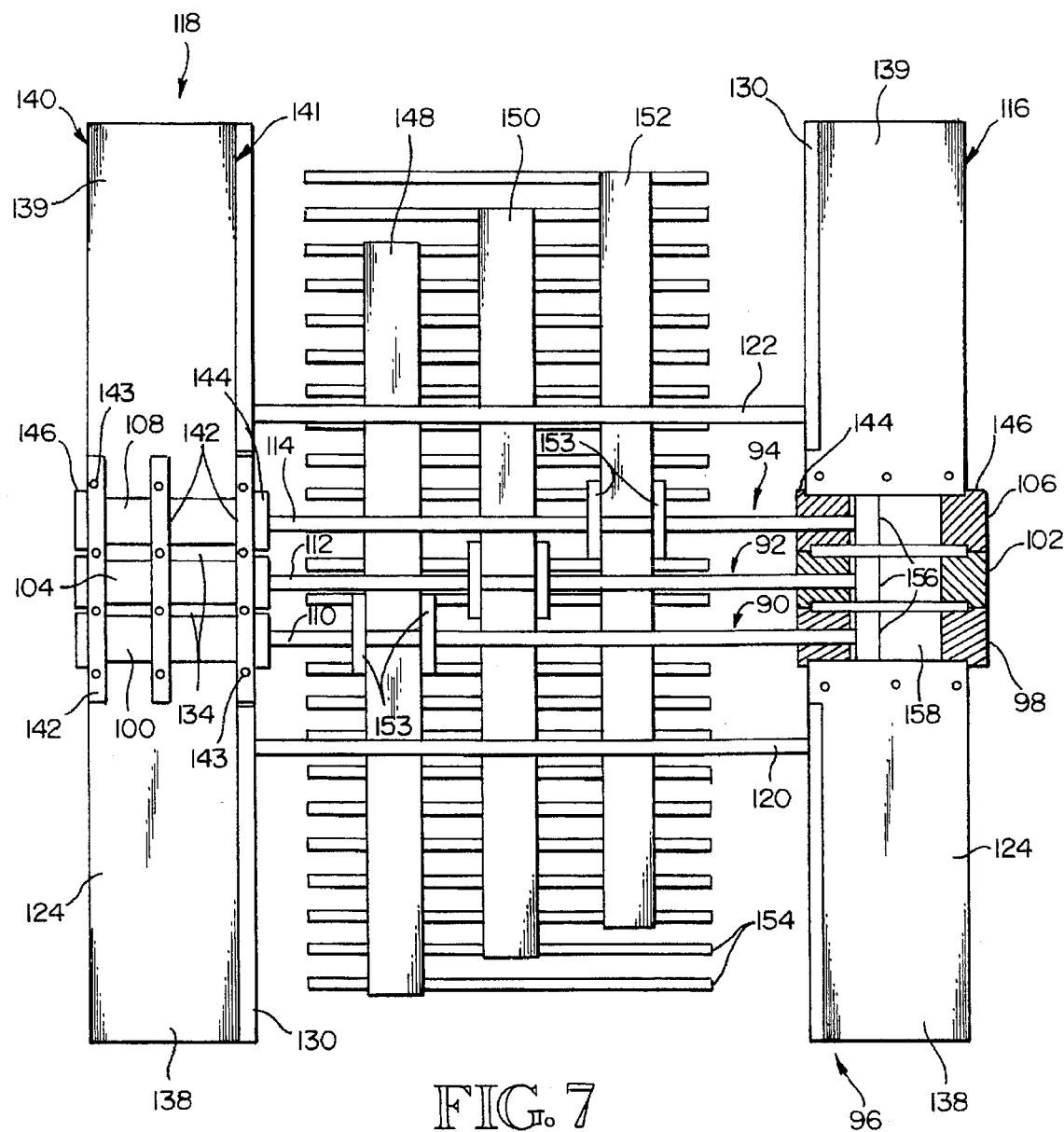
FIG. 7 is a bottom plan view of the drive assembly shown in FIG. 5 with the cylinder barrel clamps omitted.

Referring also to FIG. 7, each cylinder barrel component 98, 100, 102, 104, 106, 108 is nested in a valley 136 of the corrugated center section 132. The component 98, 100, 102, 104, 106, 108 is connected to and is perpendicular to the mounting frame member 116, 118. In preferred form, each cylinder barrel component has at least one detachably connectable clamp 142 that, when connected, serves together with the valley 136 to clamp the cylinder barrel component to the mounting frame member 116, 118. For clarity, FIGS. 7 and 8 depict a set of clamps in which each clamp 142 connects all three cylinder barrel components to the mounting frame member 116. Bolts 143 (shown in FIG. 6) secure the clamps 142 to the mounting frame member. Individual clamps for each cylinder barrel component may also be provided instead of a single clamp 142 that clamps all three cylinder barrel components at the respective end of the drive unit. The individual clamps may be of the type found in my aforementioned U.S. Pat. No. 4,793,469. In this description and the claims that follow it, the phrase "at least one clamp member for each cylinder barrel component" and the like are intended to include a single clamp, such as clamp 142, that engages a plurality of components, as well as separate individual clamps. The preferred embodiment shown in FIGS. 5–9 includes three clamps for each cylinder barrel component. As shown, there are three clamps 142, each of which clamps all three cylinder barrel components to the respective mounting frame member 116, 118. Alternatively, nine individual clamps could be provided.

Each cylinder barrel component has an inboard radial end flange 144 and an opposite outboard radial end flange 146. The cylinder barrel components are received in their respective valleys 136 with their radial flanges 144, 146 positioned immediately endwise of the ends of the valleys 136. In this context, the cutouts in the ribs 130 that extend along the inboard edges of the plates 124 are considered to be extensions of and part of the valleys 136 formed in the corrugated center section 132. The inboard and outboard radial flanges 144, 146 have radial shoulders which substantially abut the ribs 130 adjacent the cutouts in the ribs 130, and the outboard longitudinal end surface of the corrugated center section 132 adjacent the valleys, respectively. The clamps 142 are preferably positioned so that each radial shoulder 144, 146 also substantially abuts one of the clamps 142, as shown in FIGS. 6 and 7. As shown, the three clamps 142 are aligned with the ribs 126, 128, 130. The flanged ends 144, 146 thus act to stabilize the cylinder barrel components in their respective valleys 136 and to prevent longitudinal movement of the cylinder barrel components.

Referring to FIGS. 5–7, the drive frame assembly includes three transverse drive beams 148, 150, 152, one for each drive unit 90, 92, 94. Each drive beam 148, 150, 152 is perpendicular to and connects to its respective drive unit 90, 92, 94. Preferably, drive beams 148, 150, 152 are clamped to piston components 110, 112, and 114, respectively, via clamps 153. The clamps 153 are split into upper and lower portions to permit them to be placed around the piston rods. The upper portion is permanently secured to the respective transverse drive beam 148, 150, 152, and the lower portion is removably securable to the upper portion. Means are provided for preventing longitudinal movement of the piston rod relative to the respective transverse drive beam 148, 150, 152. This may be done by a threaded engagement, as in the prior art clamps 76 shown in FIGS. 1 and 2. A preferred alternative is to provide each clamp 153 with an internal circumferential ridge that is received into a circumferential groove on the outer surface of the piston rod to provide a keyed engagement similar to that illustrated in FIGS. 18 and 19. Opposite side portions of drive beams 148, 150, 152 ride on bearing strips (not shown), which are secured to the tops of the longitudinal frame members 120, 122. These bearing strips may be like strips 78, 80 shown in the prior art drive (FIGS. 1 and 1A).

A plurality of connectors 154 are used to connect each drive beam 148, 150, 152 to a set of reciprocating conveyor floor slat members (not shown). These floor slat members reciprocate when the piston component moves linearly back and forth. The manner in which the slats reciprocate to convey a load is described in my aforementioned U.S. Pat. No. 5,165,524 and is illustrated in FIGS. 2–6 of that patent. The control circuitry (not shown) may be like that disclosed in my aforementioned U.S. Pat. No. 5,096,356. It preferably provides two-way conveyance, i.e. allows a load to be conveyed in either of two opposite directions.

Referring to FIG. 6, each piston component 110, 112, 114 has a piston head 156 at each end that moves within a hollow cylindrical opening 158 inside the respective cylinder barrel component. As one piston head 156 thrusts outboard inside cylindrical opening 158 of its corresponding cylindrical barrel component, the other piston head 156 is pulled inboard within its cylindrical opening 158. This back and forth thrusting movement moves the drive beams 148, 150, 152 to, in turn, reciprocate the floor slat members.

A plurality of longitudinal guide beams 155 (shown in FIG. 6 and in phantom in FIG. 5) rest on and are secured to the ribs 126, 128, 130 of the mounting frame members 116, 118. Each longitudinal guide beam 155 helps guide and align a corresponding floor slat member during reciprocating movement.

As described above, in accordance with the invention, each cylinder barrel component is nested in a corresponding valley 136 of the corrugated center section 132 of a transverse mounting frame member 116, 118. This achieves a vertical distance d between the longitudinal center of the cylinder barrel component and the longitudinal center of the floor slat member that is smaller than the vertical distances found in the prior art and in other patents of interest. The smaller distance d reduces the bending moment and, thus, the thrust lines of the drive units 90, 92, 94 maintain better alignment. By having a truer alignment, thrust force is transferred to the stronger structural members, whereas misalignment can lead to thrust force being transferred to structurally weaker frame members.

FIGS. 10–12 illustrate alternative embodiments of the mounting frame members. More specifically, they illustrate alternative embodiments of the corrugated center sections 132A, 132B, 132C, respectively. In the center sections 132 shown in FIGS. 5–9, the valleys 136 have a semicircular cross section corresponding to the outer cylindrical surfaces of the cylinder barrel components. The ridges 134 between valleys 136 are flat and substantially abut the clamps 142. In the alternative embodiments, the valleys 136A, 136B, 136C have noncircular, angular cross sections, and the ridges 134A, 134B, 134C are spaced from the clamps 142.

FIGS. 13–15 illustrate an alternative embodiment of the drive unit 170. The drive unit 170 includes a cylinder barrel component 176 at one end of the unit 170, and a piston component having a piston head 172 and piston rod 174. The piston head 172 reciprocates in a cylindrical opening 178 defined by the cylinder barrel component 176. The piston head 172 and cylinder barrel component 176 are like the ones shown in FIGS. 5–7 and described above. In a complete drive assembly, the cylinder barrel components 176 of the drive units 170 are nested in a corrugated center section of a transverse mounting frame member, as described above.

At the end of the drive unit 170 opposite the cylinder barrel component 176, the piston rod 174 extends under and is connected to a transverse mounting frame member 180. Transverse mounting frame member 180 is preferably an elongated channel member, similar to the prior art channel member 16, 18 shown in FIG. 1, with two flanges 182, 184 and a base 186 connecting the two flanges 182, 184. Longitudinal guide beams 155, one of which is shown in FIGS. 13–15, rest on and are secured to the flanges 182, 184.

The piston rods 174 of the drive units 170 are connected to the mounting frame member 180 by means that includes an elongated clamp 188. The clamp 188 is split into an upper portion 190 and a lower portion 192 to permit easy attachment of the clamp 188 to, and detachment of the clamp 188 from, the piston rods 174. Each piston rod 174 is received in a sleeve 194 that is carried by and forms part of the clamp 188. The sleeve 194 provides an elongated bearing surface for slidably supporting the piston rod 174 as it reciprocates longitudinally during operation of the drive unit 170. The clamp 188 also includes laterally extending elongated inboard and outboard portions 196, 198. The inboard and outboard portions 196, 198 are longitudinally spaced from each other and are connected by the sleeves 194. Each of the inboard and outboard portions 196, 198 and the sleeves 194 has an upper portion that is part of the upper portion 190 of the clamp 188 and a lower portion that is part of the lower portion 192 of the clamp 188.

The clamp 188 and the piston rods 174 are removably secured to the base 186 of the channel member 180. A plurality of engagement members 200 are positioned above the base 186 in two spaced-apart rows that are aligned with the inboard and outboard clamp portions 196, 198, respectively. As shown in FIG. 14, there are six engagement members 200 positioned above each of the elongated clamp portions 196, 198. The elongated portions 196, 198 have openings 202 extending therethrough which are aligned with threaded openings 204 in the engagement members 200 and openings 206 extending through the base 186. Bolts 208 extend through the aligned openings 202, 204, 206 to secure the upper and lower clamp portions 190, 192 together and the clamp 188 to the piston rods 174, and to secure the clamp 188 and the piston rods 174 to the channel member 180.

FIG. 16 illustrates another alternative embodiment of the drive unit 220. Like the drive unit 170 shown in FIG. 13, the drive unit 220 has a cylinder barrel component 222 on one end of the unit 220 and a piston rod 224 that extends outwardly from the cylinder barrel component 222. The end of the piston rod 224 opposite the cylinder barrel component 222 is connected to a transverse mounting frame member 180 in the manner described above in connection with FIGS. 13–15. The major difference between the two embodiments is in the structure of the cylinder barrel components and the piston head ends of the piston components.

Referring to FIG. 16, the drive unit 220 has an elongated cylinder barrel component 222 in which the axial opening defined by the cylinder is divided into two separate openings 226, 228 and 230, 232, respectively, by a fixed divider wall 234. The piston rod 224 extends into the cylinder 222 and through an opening 236 in the divider wall 234. The opening 236 is sealed around the rod 224 to prevent leakage of hydraulic fluid between the separate axial openings. The piston component of the drive unit 220 has two piston heads 238, 240 that are carried by and spaced longitudinally apart along the piston rod 224. Piston head 238 is received in axial opening 226, 228 and divides it into a first working chamber 226 and a second working chamber 228. Piston head 240 is received in axial opening 230, 232 and divides it into a third working chamber 230 and a fourth working chamber 232. A first conduit 242 connects the first working chamber 226 with the third working chamber 230. A second conduit 244 connects the second working chamber 228 with the fourth working chamber 232. Preferably, the piston rod 224 extends past the outboard piston head 238 and through the outboard end of the cylinder barrel component 220 so that the forces in the two working portions 226, 228 and 230, 232 of the cylinder 222 remain balanced as the piston component reciprocates.

During operation of the drive unit 220, hydraulic pressure is introduced into working chambers 226, 230 and chambers 228, 232 are connected to return to extend the piston component, i.e. move it to the right as shown in FIG. 16. To retract the piston component, hydraulic pressure is introduced into chambers 228, 232, and chambers 226, 230 are connected to return. This operation of the drive unit 220 may be accomplished by means a hydraulic and control system of a known type.

In a complete drive assembly, a plurality of drive units 220 are positioned side-by-side. Preferably, the cylinder barrel components 222 are mounted to a corrugated transverse mounting frame member in the same manner as the cylinder barrel components shown in FIGS. 5–9 are mounted. Referring to FIG. 16, the mounting frame member 116A to which the cylinder barrel components 222 are mounted is a modified form of the mounting frame member 116 shown in FIGS. 5–7. The member 116A is wider in the longitudinal directional than the member 116 shown in FIGS. 5–7 in order to accommodate the elongated cylinder barrel portion 222. Because of its greater extent in the longitudinal direction of the drive unit 220, the member 116A has five stiffening ribs 126, 130, 246, instead of the three ribs 126, 128, 130 shown in FIG. 5. As in FIG. 5, the ribs 126, 130 extend along the opposite longitudinal edges of the mounting frame member 116A. There are three intermediate ribs 246 that are spaced apart and positioned between the edge ribs 126, 130. The cylinder barrel components 222 are secured in the valleys of the corrugated center section of the frame member 116A by a plurality of clamps 142. There is a clamp 142 aligned with each of the ribs 126, 130, 246. As in the other embodiments illustrated and described herein, each cylinder barrel component 222 has opposite end flanges 144, 146 which restrain longitudinal movement of the cylinder barrel component 222, as described above.

The embodiment of FIG. 16, like the embodiment shown in FIGS. 5–9, provides increased drive force of the drive units while maintaining a relatively small diameter of the cylinder portions of the drive units. The small diameters help to minimize the distance d between the longitudinal center lines of the drive units and the floor slats and, thereby, to maximize the advantages of the corrugated mounting arrangement.

FIG. 17 shows an alternative mounting arrangement for the outer ends of the piston rods of drive units, such as the drive units 170, 220 shown in FIGS. 13 and 16. Referring to FIG. 17, the outer ends of three piston rods 274 are slidably mounted on an elongated transverse mounting frame member 280. The mounting frame member 280 has a center portion and opposite end portions secured to and extending endwise outwardly from the center portion. Each end portion has an I-beam configuration that includes a horizontal plate body or web 286 and a pair of vertical ribs or flanges 282, 284 extending along opposite inboard and outboard longitudinal edges of the body 286. The ribs 282, 284 are secured to the body 286 in the same manner that the ribs 130 shown in FIGS. 5–8 are secured to the plate body 124.

The center portion of the mounting frame member 280 is formed by a clamp body. The clamp body may be integrally formed or may be formed by securing together a plurality of upper clamp portions. As shown, the clamp body is formed by welding together three upper clamp portions 288, one for each piston rod 274. The upper clamp portions 288 are also secured to the end portions of the mounting frame member by suitable means, such as welding. A lower clamp portion or clamp member 290 is provided for each piston rod 274. Each lower clamp portion 290 is removably attachable to the respective upper portion 288 by bolts 292. Each lower portion 290 is separately detachable from its upper portion 288 to allow any one of the piston rods 274 to be selectively detached from the mounting frame member 280.

An axial opening 294 extends through each clamp 288, 290. The opening 294 is divided between the upper and lower clamp portions 288, 290 to permit insertion of the piston rod 274 into the opening 294 and removal of the rod 274 therefrom. The opening 294 is cylindrical and has at each of its ends a reduced diameter neck portion 296. Each neck 296 forms an inwardly facing radial shoulder 298. A cylindrical split bearing 300, 302 is received into the opening 294. Each half of the bearing 300, 302 is formed by a semicylindrical bearing insert. The upper half 300 of the bearing is received into the upper clamp portion 288, and the lower half 302 is received into the lower clamp portion 290. The opposite radial ends of the bearing 300, 302 abut the shoulders 298 to prevent longitudinal movement of the bearing 300, 302 and retain it in the axial opening 294. The assembled bearing has an axial opening extending therethrough which slidably receives and supports the piston rod 274.

In embodiments employing the mounting arrangement shown in FIG. 17, the opposite ends of the drive units preferably have the flanged cylinder barrel configuration shown in FIGS. 5–8 or 16. The cylinder barrel components of the drive units are preferably mounted in the manner shown in those figures and described above. In addition, center portions of the piston rods 274 are preferably connected to transverse drive beams in the manner shown in FIG. 5 or in the manner shown in FIGS. 18–20.

Figure 18:
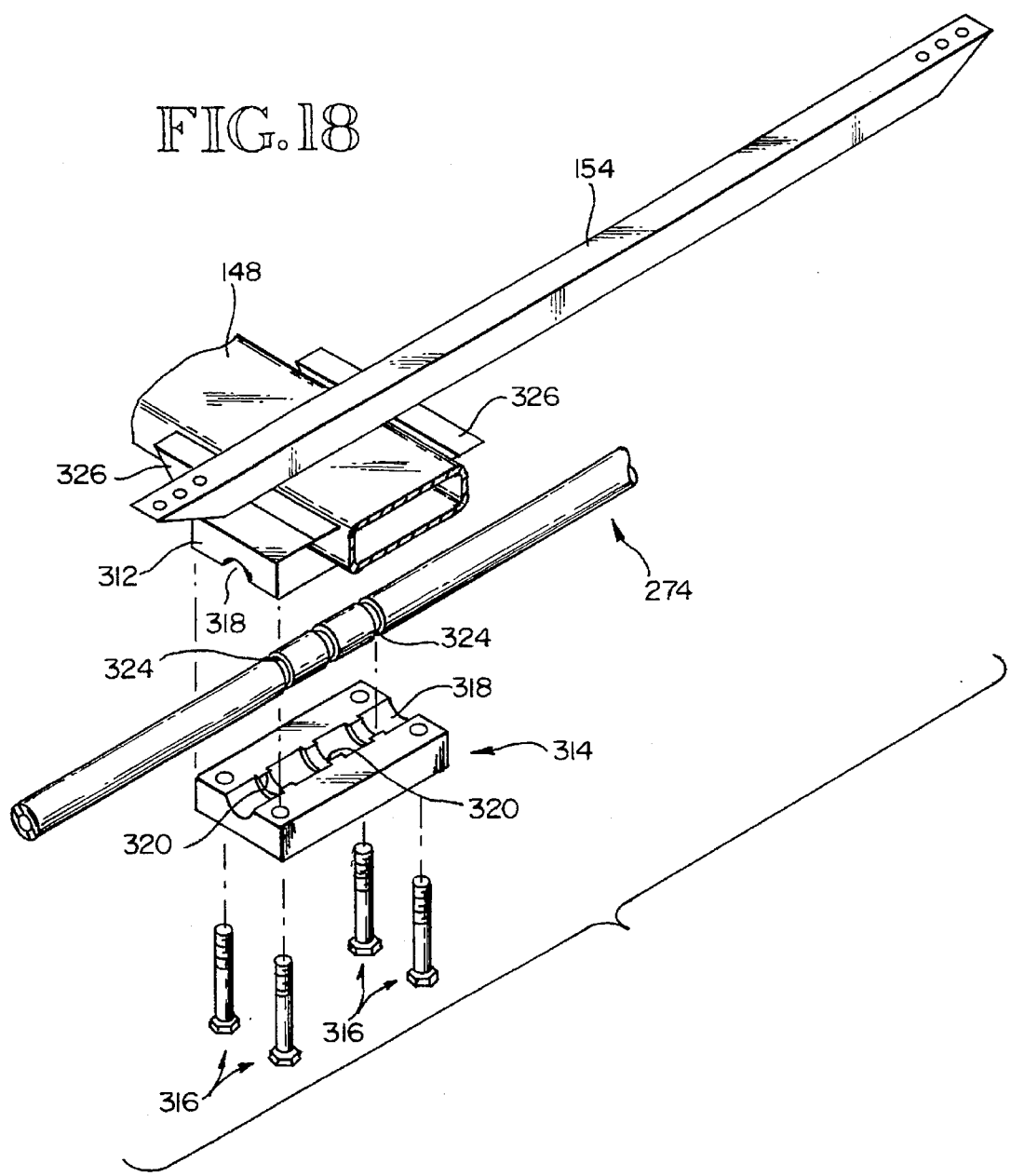
FIG. 18 is an exploded pictorial view of an arrangement for connecting a piston rod to a transverse drive beam.
Figure 19:
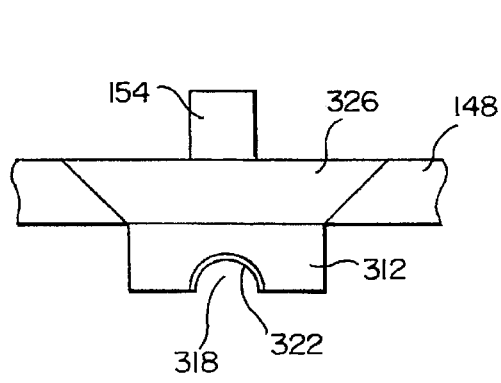
FIG. 19 is an elevational end view of the transverse drive beam shown in FIG. 18 and the elements permanently secured thereto.
Figure 20:
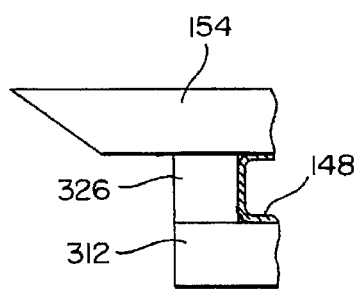
FIG. 20 is a fragmentary side elevational view of the elements shown in FIG. 19, with the transverse drive beam shown in section.

FIGS. 18–20 show a clamping arrangement for connecting a mid portion of a piston rod 274 of a drive unit to its transverse drive beam 148. Each of the opposite ends of the drive unit preferably has one of the configurations, and is mounted in one of the arrangements, shown in FIGS. 5–17. FIG. 18 illustrates the mounting of one of the piston rods 274 of a reciprocating floor conveyor to its respective transverse drive beam 148. Preferably, the conveyor includes one or more additional drive units that are mounted to their respective transverse drive beams in the same manner. The conveyor also includes a number of connectors 154 for connecting the transverse drive beams to the floor slat members (not shown). One such connector 154 is shown in FIGS. 18–20.

Referring to FIGS. 18–20, the piston rod 274 is connected to the transverse drive beam 148 by means of a clamp assembly including a two-part clamp 312, 314. The clamp has an upper portion 312 with an upper surface that extends longitudinally across and is permanently secured to the lower surface of the transverse drive beam 148, such as by welding. The lower portion 314 of the clamp is removably attachable to the upper portion 312 by means of bolts 316. The clamp 312, 314 has an axial opening 318 extending therethrough, half of which is formed by each clamp portion 312, 314. The opening 318 is generally cylindrical and has three axially spaced reduced diameter portions 320. These reduced diameter portions 320 form internal ridges defining radial shoulders 322, best seen in FIG. 19. Three circumferential grooves 324 are formed on the outer surface of a mid portion of the piston rod 274. These grooves 324 correspond in size and location to the reduced diameter portions 320 of the clamp axial opening 318.

When the piston rod 274 is received into the axial opening 318 of the clamp and the clamp portions 312, 314 are secured together by bolts 316, the radial walls defining the grooves 324 on the piston rod 274 abut the shoulders 322 formed on the clamp portions 312, 314 to restrain the piston rod 274 against axial (longitudinal) movement relative to the clamp 312, 314. Since the upper clamp portion 312 is permanently secured to the transverse drive beam 148, the piston rod 274 is also restrained against axial movement relative to the transverse drive beam 148. Thus, when the drive unit is operated to convey a load, the reciprocating movement of the piston rod 274 is transmitted to the transverse drive beam 148 by the clamp 312, 314. The bottom surface of the connector 154 is secured, such as by welding, to the top of the transverse drive beam 148 to transmit the reciprocating movement to a floor slat member which is connected to the connector 154.

The clamp assembly shown in FIGS. 18–20 further includes two trapezoidal members 326 for reinforcing the connection between the piston rod 274 and the transverse drive beam 148 and connector 154. Each trapezoidal member 326 provides a greater area of connection between the transverse drive beam 148 and the upper clamp portion 312 and also provides areas of direct connection between the clamp portion 312 and the connector 154. The lower base of the member 326 is secured to the upper surface of the clamp portion 312. The nonparallel sides of the member 326 extend upwardly and outwardly from the base to an upper surface that is parallel to the base and is secured to the connector 154. The side of the member 326 adjacent to the transverse drive beam 148 is preferably secured to the side of the beam 148 to further reinforce the mounting arrangement. As shown in FIG. 18, the assembly includes two longitudinally spaced trapezoidal members 326 positioned on opposite sides of the beam 148.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. An elongated mounting frame member for use in mounting at least two piston-cylinder drive units in a side-by-side relationship, each said drive unit having a piston component and a cylinder barrel component, said mounting frame member comprising:

an elongated body having a corrugated center section comprising at least two alternating ridges and valleys, extending transversely of said body, and a pair of opposite end sections extending endwise outwardly from said corrugated center section; each said valley of said corrugated center section being sized to receive nested therein one of the cylinder barrel components of the drive units; and connector means for connecting the cylinder barrel components of the drive units to the mounting frame member, with said cylinder barrel components of said drive units nested within said valleys of said corrugated center section;

wherein in use said opposite end sections of said elongated body of the mounting frame member serve to mount the mounting frame member and the drive units to a frame, with the piston components of the drive units extending endwise outwardly from the cylinder barrel components of the drive units, perpendicular to the mounting frame member.

2. The mounting frame member of claim 1, further comprising at least one stiffening rib secured to said elongated body of the mounting frame member, said rib extending lengthwise of said body and crosswise of the ridges and valleys of the corrugated center section.

3. The mounting frame member according to claim 2, wherein said rib extends along a longitudinal edge of said body adjacent where the piston components extend endwise outwardly from the cylinder barrel components.

4. The mounting frame member according to claim 1, wherein the connector means includes at least one clamp member for each cylinder barrel component, which is detachably connectable to the mounting frame member, each said clamp member when connected to the mounting frame member serving together with a valley of said corrugated center section to clamp a cylinder barrel component to the mounting frame member.

5. The mounting frame member of claim 4, wherein the connector means comprises two of said clamp members for each cylinder barrel component; each cylinder barrel component comprises two opposite end flanges, each said flange having a radial shoulder; and said valleys are dimensioned, and said clamp members are positioned and dimensioned, so that said radial shoulders substantially abut said clamp members and the mounting frame member adjacent said valleys when the cylinder barrel components are nested within said valleys and clamped to the mounting frame member by said clamp members.

6. The mounting frame member of claim 5, which further comprises a stiffening rib secured to said elongated body of the mounting frame member and extending along a longitudinal edge of said body, crosswise of said ridges and valleys, adjacent where the piston components extend endwise outwardly from the cylinder barrel components; and in which said radial shoulder of one of said end flanges of each cylinder barrel component substantially abuts said rib when the cylinder barrel components are nested within said valleys.

7. The mounting frame member according to claim 1, wherein each cylinder barrel component comprises two opposite end flanges, each said flange having a radial shoulder; and said valleys are dimensioned so that said radial shoulders substantially abut the mounting frame member when the cylinder barrel components are nested within said valleys.

8. A drive assembly for a reciprocating floor slat conveyor, comprising:

at least two piston-cylinder drive units in a side-by-side relationship, each said drive unit having a cylinder barrel component at each end and a centrally positioned piston component having a piston head at each end, said piston heads being received within said cylinder barrel components;

a pair of longitudinally spaced apart transverse mounting frame members, each said mounting frame member comprising an elongated body including a corrugated center section having at least two alternating ridges and valleys extending transversely of the body, and opposite end sections extending endwise outwardly from said corrugated center section; said cylinder barrel components of the drive units being connected to the mounting frame members, with each said cylinder barrel component being nested within one of said valleys of the corresponding mounting frame member; and a transverse drive beam for each drive unit, extending across and connected to the piston component of the drive unit, each transverse drive beam including connectors configured to connect the drive beam to a set of conveyor floor slat members;

wherein in use the opposite end sections of said elongated bodies of the mounting frame members serve to mount the mounting frame members and the drive units to a frame, with the piston components of the drive units extending perpendicular to the mounting frame members and the drive beams extending perpendicular to the drive units.

9. The drive assembly according to claim 8, comprising at least one stiffening rib secured to said elongated body of each mounting frame member, each rib extending lengthwise of its mounting frame member and crosswise of the ridges and valleys of the corrugated center section of said body of its mounting frame member.

10. The drive assembly according to claim 9, wherein each said rib extends along a longitudinal edge of said body of its mounting frame member adjacent where the piston components project outwardly from the cylinder barrel components.

11. The drive assembly according to claim 8, comprising at least one clamp member for each cylinder barrel component, each said clamp member being detachably connectable to a mounting frame member and, when connected to its mounting frame member, serving together with a valley of the mounting frame member to clamp a cylinder barrel component to the mounting frame member.

12. The drive assembly of claim 11, which comprises two of said clamp members for each cylinder barrel component; in which each cylinder barrel component comprises two opposite end flanges, each said flange having a radial shoulder; and in which said valleys are dimensioned, and said clamp members are positioned and dimensioned, so that said radial shoulders substantially abut said clamp members and the respective mounting frame member adjacent said valleys when the cylinder barrel components are nested within said valleys and clamped to the mounting frame members by said clamp members.

13. The drive assembly of claim 12, which comprises a stiffening rib secured to said elongated body of each mounting frame member and extending along a longitudinal edge of said body, crosswise of said ridges and valleys, adjacent where the piston components extend endwise outwardly from the cylinder barrel components; and in which said radial shoulder of one of said end flanges of each cylinder barrel component substantially abuts said rib of the respective mounting frame member when the cylinder barrel components are nested within said valleys.

14. The drive assembly according to claim 8, wherein each cylinder barrel component comprises two opposite end flanges, each said flange having a radial shoulder; and said valleys are dimensioned so that said radial shoulders substantially abut the respective mounting frame member when the cylinder barrel components are nested within said valleys.

15. The drive assembly of claim 8, in which each piston component includes a piston rod extending between said piston heads and having a least one circumferential groove on its outer surface, and which comprises a piston rod clamp assembly for each drive unit; said clamp assembly including an upper clamp portion secured to the respective transverse drive beam, and a lower clamp portion removably attachable to said upper clamp portion to clamp the piston rod therebetween; said upper and lower clamp portions together defining an axial opening through which the piston rod extends, and having internal ridge portions positioned to be received into said grooves on the piston rod to prevent longitudinal movement of the piston rod relative to the respective transverse drive beam.

16. The drive assembly of claim 15, in which each said upper clamp portion has an upper surface that extends longitudinally across and is secured to a lower surface of the respective transverse drive beam.

17. The drive assembly of claim 16, in which each said clamp assembly further comprises a pair of longitudinally spaced reinforcing members positioned on opposite sides of the respective transverse drive beam, each said reinforcing member having a lower portion secured to said upper clamp portion and an upper portion secured to one of said connectors configured to connect the drive beam to a set of floor slat members.

18. A drive assembly for a reciprocating floor slat conveyor, comprising:
at least two side-by-side piston-cylinder drive units, each drive unit including a cylinder barrel component and a piston component having a piston head and a piston rod, said piston head being received within said cylinder barrel component, and said cylinder barrel component being positioned at one end of the drive unit;
a pair of longitudinally spaced apart transverse mounting frame members; wherein a first of said mounting frame members comprises an elongated body having a corrugated center section with at least two alternating ridges and valleys extending transversely of the body, and opposite end sections extending endwise outwardly from said corrugated center section; wherein said valleys of said corrugated center section receive nested therein the cylinder barrel components; and wherein a second of said mounting frame members comprises an elongated member;
a first connector means for connecting the cylinder barrel components of the drive units to the first mounting frame member, with each said cylinder barrel component nested within one of said valleys of said corrugated center section of said elongated body of the first mounting frame member;
a second connector means for connecting the piston rods at an end opposite the piston heads to the second mounting frame member; and
a transverse drive beam for each drive unit, extending across and connecting to the piston rod of the drive unit, each drive beam including connectors configured to connect the drive beam to a set of conveyor floor slat members;
wherein in use the first and second mounting frame members serve to mount both of the mounting frame members and the drive units to a frame, with the piston rods of the drive units extending perpendicular to the mounting frame members and the drive beams extending perpendicular to the drive units.

19. The drive assembly according to claim 18, wherein the first connector means includes at least one clamp member for each cylinder barrel component, which is detachably connectable to the first mounting frame member, each said clamp member when connected to the first mounting frame member serving together with a valley of said body of the first mounting frame member to clamp a cylinder barrel component to the first mounting frame member.

20. The drive assembly according to claim 19, in which the second connector means comprises a clamp that slidably and detachably connects the piston rods to the second mounting frame member.

21. The drive assembly according to claim 18, comprising at least one strengthening rib secured to said body of the first mounting frame member, said rib extending lengthwise of the first mounting frame member and crosswise of the ridges and valleys of the corrugated center section of said body of the first mounting frame member.

22. The drive assembly according to claim 18, wherein each cylinder barrel component comprises two opposite end flanges, each said flange having a radial shoulder; and said valleys are dimensioned so that said radial shoulders substantially abut the first mounting frame member when the cylinder barrel components are nested within said valleys.

23. The drive assembly according to claim 22, wherein the first connector means includes at least one clamp member for each cylinder barrel component, which is detachably connectable to the first mounting frame member, each said clamp member when connected to the first mounting frame member serving together with a valley of said body of the first mounting frame member to clamp a cylinder barrel component to the first mounting frame member; and wherein one of said radial shoulders of the cylinder barrel component substantially abuts the clamp member when the cylinder barrel component is clamped to the first mounting frame member by the clamp member.

24. The drive assembly of claim 18, in which each piston rod has at least one circumferential groove on its outer surface, and which comprises a piston rod clamp assembly for each drive unit; said clamp assembly including an upper clamp portion secured to the respective transverse drive beam, and a lower clamp portion removably attachable to said upper clamp portion to clamp the piston rod therebetween; said upper and lower clamp portions together defining an axial opening through which the piston rod extends, and having internal ridge portions positioned to be received into said grooves on the piston rod to prevent longitudinal movement of the piston rod relative to the respective transverse drive beam.

25. The drive assembly of claim 24, in which each said upper clamp portion has an upper surface that extends longitudinally across and is secured to a lower surface of the respective transverse drive beam.

26. The drive assembly of claim 25, in which each said clamp assembly further comprises a pair of longitudinally spaced reinforcing members positioned on opposite sides of the respective transverse drive beam, each said reinforcing member having a lower portion secured to said upper clamp portion and an upper portion secured to one of said connectors configured to connect the drive beam to a set of floor slat members.

27. The drive assembly of claim 18, wherein the second mounting frame member comprises a clamp body that forms a center section, and a pair of opposite end sections secured to and extending endwise outwardly from said clamp body, each said end section of the second mounting frame member comprising a beam including a substantially horizontal web and at least one vertical flange; and said second connector means comprises a clamp member for each piston rod, each said clamp member being removably attachable to said clamp body and forming together with said clamp body an opening extending longitudinally therethrough for slidably and removably receiving the respective piston rod.

28. The mounting frame member of claim 27, in which each said end section of the second mounting frame member comprises an I-beam.

29. The mounting frame member of claim 27, wherein said clamp body includes a semicylindrical bearing insert for each piston rod and a main portion, and each said clamp member includes a bearing insert and a main portion, said main portions of said clamp body and said clamp members defining radial shoulders for retaining said inserts, and said insert of each said clamp member cooperating with one of said inserts of said clamp body to form a cylindrical bearing for slidably supporting the respective piston rod.

30. The drive assembly of claim 27, in which each piston rod has at least one circumferential groove on its outer surface, and which comprises a piston rod clamp assembly for each drive unit; said clamp assembly including an upper clamp portion secured to the respective transverse drive beam, and a lower clamp portion removably attachable to said upper clamp portion to clamp a mid portion of the piston rod therebetween; said upper and lower clamp portions together defining an axial opening through which the piston rod extends, and having internal ridge portions positioned to be received into said grooves on the piston rod to prevent longitudinal movement of the piston rod relative to the respective transverse drive beam.

31. The drive assembly of claim 30, in which each said upper clamp portion has an upper surface that extends longitudinally across and is secured to a lower surface of the respective transverse drive beam.

32. A drive assembly for a reciprocating floor slat conveyor, comprising:

at least two side-by-side piston-cylinder drive units; each drive unit having a cylinder barrel component at one end of the unit, and a piston component with a piston rod and two piston heads, each piston head being received in a separate chamber within said cylinder barrel component;

a pair of longitudinally spaced apart transverse mounting frame members; wherein a first of said mounting frame members comprises an elongated body having a corrugated center section with at least two alternating ridges and valleys extending transversely of the body, and opposite end sections extending endwise outwardly from said corrugated center section; wherein said valleys of said corrugated center section receive nested therein the cylinder barrel components, and the cylinder barrel components are connected to the first mounting frame member; and wherein end portions of the piston rods opposite the piston heads are connected to a second of said mounting frame members; and a transverse drive beam for each drive unit, extending across and connecting to the piston rod of the drive unit, each drive beam including connectors configured to connect the drive beam to a set of conveyor floor slat members;

wherein in use the first and second mounting frame members serve to mount both of the mounting frame members and the drive units to a frame, with the piston rods of the drive units extending perpendicular to the mounting frame members and the drive beams extending perpendicular to the drive units.

33. The drive assembly according to claim 32, comprising at least one stiffening rib secured to said body of said first mounting frame member, said rib extending lengthwise of said body and crosswise of the ridges and valleys of the corrugated center section.

34. The drive assembly according to claim 33, wherein said rib extends along a longitudinal edge of said body of said first mounting frame member adjacent where the piston components project outwardly from the cylinder barrel components.

35. The drive assembly according to claim 32, wherein each cylinder barrel component comprises two opposite end flanges, each said flange having a radial shoulder; and said valleys are dimensioned so that said radial shoulders substantially abut the first mounting frame member when the cylinder barrel components are nested within said valleys.

36. The drive assembly according to claim 32, comprising at least one clamp member for each cylinder barrel component, which is detachably connectable to said first mounting frame member, each said clamp member when connected to said first mounting frame member serving together with a valley of said body of the mounting frame member to clamp a cylinder barrel component to the mounting frame member.

37. The drive assembly of claim 36, which comprises two of said clamp members for each cylinder barrel component; in which each cylinder barrel component comprises two opposite end flanges, each said flange having a radial shoulder; and in which said valleys are dimensioned, and said clamp members are positioned and dimensioned, so that said radial shoulders substantially abut said clamp members and the first mounting frame member adjacent said valleys when the cylinder barrel components are nested within said valleys and clamped to the first mounting frame member by said clamp members.

38. The drive assembly of claim 37, which comprises a stiffening rib secured to said elongated body of the first mounting frame member and extending along a longitudinal edge of said body, crosswise of said ridges and valleys, adjacent where the piston components extend endwise outwardly from the cylinder barrel components; and in which said radial shoulder of one of said end flanges of each cylinder barrel component substantially abuts said rib when the cylinder barrel components are nested within said valleys.

39. The drive assembly of claim 32, in which each piston rod has at least one circumferential groove on its outer surface, and which comprises a piston rod clamp assembly for each drive unit; said clamp assembly including an upper clamp portion secured to the respective transverse drive beam, and a lower clamp portion removably attachable to said upper clamp portion to clamp the piston rod therebetween; said upper and lower clamp portions together defining an axial opening through which the piston rod extends, and having internal ridge portions positioned to be received into said grooves on the piston rod to prevent longitudinal movement of the piston rod relative to the respective transverse drive beam.

40. The drive assembly of claim 39, in which each said upper clamp portion has an upper surface that extends longitudinally across and is secured to a lower surface of the respective transverse drive beam.

41. The drive assembly of claim 40, in which each said clamp assembly further comprises a pair of longitudinally spaced reinforcing members positioned on opposite sides of the respective transverse drive beam, each said reinforcing member having a lower portion secured to said upper clamp portion and an upper portion secured to one of said connectors configured to connect the drive beam to a set of floor slat members.

42. The drive assembly of claim 32, in which the second mounting frame member comprises a clamp body that forms a center section, and a pair of opposite end sections secured to and extending endwise outwardly from said clamp body, each said end section of the second mounting frame member comprising a beam including a substantially horizontal web and at least one vertical flange; and which comprises a clamp member for each piston rod, each said clamp member being removably attachable to said clamp body and forming together with said clamp body an opening extending longitudinally therethrough for slidably and removably receiving the respective piston rod.

43. The mounting frame member of claim 42, in which each said end section of the second mounting frame member comprises an I-beam.

44. The mounting frame member of claim 22, wherein said clamp body includes a semicylindrical bearing insert for each piston rod and a main portion, and each said clamp member includes a bearing insert and a main portion, said main portions of said clamp body and said clamp members defining radial shoulders for retaining said inserts, and said insert of each said clamp member cooperating with one of said inserts of said clamp body to form a cylindrical bearing for slidably supporting the respective piston rod.

45. The drive assembly of claim 39, in which each piston rod has at least one circumferential groove on its outer surface, and which comprises a piston rod clamp assembly for each drive unit; said clamp assembly including an upper clamp portion secured to the respective transverse drive beam, and a lower clamp portion removably attachable to said upper clamp portion to clamp a mid portion of the piston rod therebetween; said upper and lower clamp portions together defining an axial opening through which the piston rod extends, and having internal ridge portions positioned to be received into said grooves on the piston rod to prevent longitudinal movement of the piston rod relative to the respective transverse drive beam.

46. The drive assembly of claim 45, in which each said upper clamp portion has an upper surface that extends longitudinally across and is secured to a lower surface of the respective transverse drive beam.

47. An elongated mounting frame member for use in mounting at least two piston-cylinder drive units in a side-by-side relationship, each said drive unit having a cylinder component and a piston component having a piston rod extending endwise outwardly from the cylinder component, said mounting frame member comprising:

a clamp body that forms a center section of the mounting frame member;

a pair of opposite end sections secured to and extending endwise outwardly from said clamp body, each said end section comprising a beam including a substantially horizontal web and at least one vertical flange; and a clamp member for each piston rod, each said clamp member being removably attachable to said clamp body and forming together with said body an opening extending longitudinally therethrough for slidably and removably receiving the respective piston rod;

wherein in use said opposite end sections serve to mount the mounting frame member and the piston rods to a frame, with the piston rods extending outwardly from and perpendicular to the mounting frame member.

48. The mounting frame member of claim 47, in which each said end section comprises an I-beam.

49. The mounting frame member of claim 47, wherein said clamp body includes a semicylindrical bearing insert for each piston rod and a main portion, and each said clamp member includes a bearing insert and a main portion, said main portions of said clamp body and said clamp members defining radial shoulders for retaining said inserts, and said insert of each said clamp member cooperating with one of said inserts of said clamp body to form a cylindrical bearing for slidably supporting the respective piston rod.

* * * * *

UNITED STATES PATENT AND TRADEMARK OFFICE
CERTIFICATE OF CORRECTION

PATENT NO: 5,638,943

DATED: June 17, 1997

INVENTOR(S): Raymond Keith Foster

It is certified that error appears in the above-identified patent and that said Letters Patent is hereby corrected as shown below:

Column 3, line 58, "Sections" should not be capitalized.

Column 5, line 44, "10, 12" should be -- 10, 12, 14 --.
Column 5, line 57, "82, 86" should be -- 82, 84, 86 --.
Column 7, line 18, there is no period after "ribs".
Column 10, line 46, after "means", insert -- of --.

Claim 44, column 19, line 41, "claim 22" should be -- claim 42 --.

Signed and Sealed this

Twenty-fourth Day of February, 1998

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO: 5,638,943

DATED: June 17, 1997

INVENTOR(S): Raymond Keith Foster

It is certified that error appears in the above-identified patent and that said Letters Patent are hereby corrected as shown below:

Column 4, line 56, "along 14- -14" should be - - along line 14- -14 - -.

Column 10, line 57, "directional" should be - - direction - -.

Claim 15, column 15, line 28, "a least" should be - - at least - -.

Signed and Sealed this

Twenty-third Day of June, 1998

Attest:

BRUCE LEHMAN

Attesting Officer

Commissioner of Patents and Trademarks